US007851007B2

(12) United States Patent
Shimada

(10) Patent No.: US 7,851,007 B2
(45) Date of Patent: Dec. 14, 2010

(54) RUSH JUICE POWDER

(75) Inventor: Osamu Shimada, Kumamoto (JP)

(73) Assignee: Kabushiki Kaisha Toshiba, Kumamoto Pref. (JP)

( * ) Notice: Subject to any disclaimer, the term of this patent is extended or adjusted under 35 U.S.C. 154(b) by 62 days.

(21) Appl. No.: 11/979,794

(22) Filed: Nov. 8, 2007

(65) Prior Publication Data

US 2008/0138491 A1    Jun. 12, 2008

(30) Foreign Application Priority Data

Dec. 12, 2006    (JP) .............................. 2006-334121

(51) Int. Cl.
*A10N 63/02* (2006.01)
(52) U.S. Cl. .................. 426/597; 426/435; 426/49; 426/51; 426/542; 426/384; 424/93.4
(58) Field of Classification Search ................ 426/435, 426/49, 597, 51, 542, 384; 424/93.4
See application file for complete search history.

(56) References Cited

U.S. PATENT DOCUMENTS 6,416,807 B1 * 7/2002 Yamamoto .................. 426/597

6,423,309 B1 * 7/2002 Tsusaki et al. ............. 424/93.4
2004/0161524 A1 * 8/2004 Sakai et al. .................. 426/655

FOREIGN PATENT DOCUMENTS

| JP | 60203143 A | * | 10/1985 |
| JP | 2004359732 A | * | 12/2004 |
| JP | 2006-101731 | | 4/2006 |

* cited by examiner

*Primary Examiner*—Jennifer C McNeil
*Assistant Examiner*—Hong Mehta
(74) *Attorney, Agent, or Firm*—Wenderoth, Lind & Ponack, L.L.P.

(57) ABSTRACT

The present invention provides a rush juice powder which is mainly made from rush containing a high percentage of dietary fiber and having an antibacterial function and an anti-inflammatory function, has an extremely high function to eliminate active oxygen through interaction with a matcha (powdered green tea) in addition to the original functions of rush, and further is easy to drink. A rush juice powder contains a powdered rush which is made by soaking a rush in hot water for a blanching treatment, drying the blanched rush by hot-air and then pulverizing the dried rush. Both a matcha (powdered green tea) and a cyclic oligosaccharide are blended at a respectively determined ratio to the powdered rush.

9 Claims, No Drawings

RUSH JUICE POWDER

TECHNICAL FIELD

The present invention is related to a functional health food containing foodstuffs, particularly to a rush juice powder which contains a high percentage of dietary fiber and has herbal efficacy.

BACKGROUND OF THE INVENTION

A rush, a perennial plant in the genus *Juncus* used as a material of Tatami, is nontoxic and known to some people to have herbal effects acting as, for example, a diuretic agent and an anti-inflammatory agent.

Recently the sharp change and upgrading of the dietary habit and living environment has increased the number of patients of chronic diseases called lifestyle-related diseases such as hyperpiesia, hyperlipemia and diabetes. One of the major reasons for the lifestyle-related diseases is said to be obesity due to the accumulation of fat in the body through the dietary habits of the Western style diets or a variety of processed foods, the irregular eating habits and the lack of exercise, for example. In addition, active oxygen has been found to have a bad influence, being easily accumulated in the body through the contemporary life.

Active oxygen includes hydrogen peroxide, hydroxyl radical, superoxide anion radical and singlet oxygen. In particular the superoxide radical generated while breathing is thought to be a problem.

It has also been found that ingesting foods containing a lot of food additives (in particular chemically-synthesized compounds), alcoholic drinks, and smoking can promote the accumulation of active oxygen in the body. Additionally, sunburn causes ultraviolet rays to generate active oxygen in the body, and stress also is said to generate active oxygen in the body.

Therefore, in the contemporary life, the accumulation of active oxygen is an unavoidable issue, and so a lifestyle including the dietary habits which remove the active oxygen accumulated in the body is desired.

The lifestyle to remove the active oxygen requires ingesting foods free from food additives if possible, to avoid excessive eating, drinking, smoking and sunburn, and to release stress effectively. Further, daily ingestion of foods which can efficiently remove the active oxygen accumulated in the body is more effective.

So recently functional foods and supplements with a variety of herbal efficacy have been developed and provided in increasing demand. Particularly in relation with attack or appearance of symptoms of cancers or lifestyle-related diseases, dietary fiber, which is indigestible, is considered to be important. Further a variety of functional health foods made from plants with active oxygen eliminating action or antimutagenicity are on the market.

Although the same effects can be obtained by taking medicines with a variety of medical efficacy and functions, improper use of the medicines may cause side effects and drug-induced diseases. This is a serious problem. Therefore, instead of depending on such medicines, it is desirable to take natural foods which are free from side effects, capable of raising spontaneous healing power and immunity, and which have high preventive effects.

As prior art related to natural foods with active oxygen removal function or antioxidant function, rice tea made from young rice plants is disclosed in the published patent application (Patent Document 1, for example).

[Patent Document 1] Japanese Published Patent Application No. 2006-101731

SUMMARY OF THE INVENTION

When ingested as functional health foods, foods are desired to have two or more kinds of herbal efficacy rather than a single efficacy. For daily ingestion, food is also desired to be tasty and easy to drink as well as to have herbal efficacy. Further, it is desired to find out natural foods with an active oxygen removal function at a higher level.

The purpose of the present invention is to solve the above problems and provide rush juice powder which is mainly made from rush containing a high percentage of dietary fiber and having an antibacterial function and an anti-inflammatory function, and which has an extremely high ability to eliminate active oxygen through the interaction with matcha (a powdered green tea) in addition to the original functions of rush, and further is easy to drink.

In order to achieve the above purpose, a rush juice powder of the present invention comprises a powdered rush (*Juncus Effusus*) and matcha (the powdered green tea) (*Camellia Sinesis*); wherein the powdered rush is made by soaking a rush in hot water for a blanching treatment, drying the blanched rush by hot-air, and then pulverizing the dried rush; and the powdered rush is blended at a higher ratio than the matcha (i.e., there is more powdered rush than powdered green tea).

In the present invention, a rush which is nontoxic and has high dietary fiber is pulverized into a powder and mixed with matcha. Accordingly, the rush juice powder has no side-effects or drug-induced diseases even if the powder is ingested in large quantities, and it can be ingested as a drink after being dissolving in water or hot water for example. Moreover the blanching treatment and hot-air drying before pulverization prevent the powdered rush from changing its color and nature. That enables the rush to keep its quality for a long period. Further the rush juice powder has an extremely high ability to remove active oxygen generated by the interaction between the powdered rush and the matcha, so it is a functional health food having an excellent herbal efficacy. Furthermore, though a rush is harsh to the taste and inedible, the rush of the invention is soaked into the hot water so that the powdered rush has a refreshing flavor like matcha and becomes more delicious. Therefore after dissolving in the water or hot water for example, the rush juice powder becomes a green juice which is tasty and easy to drink.

It is preferable that both matcha and a cyclic oligosaccharide (cyclodextrin) are blended at a respectively determined ratio to the powdered rush.

A rush which is nontoxic and has high dietary fiber is pulverized into a powder and mixed with matcha. Accordingly, the rush juice powder has no side-effects or drug-induced diseases even if the powder is ingested in large quantities, and it can be ingested as a drink after being dissolved in water or hot water for example. Moreover the blanching treatment and hot-air drying before pulverization prevent the powdered rush from changing its color and nature. That enables the rush to keep its quality for a long period. Further the rush juice powder has an extremely high ability to remove active oxygen generated by the interaction between the powdered rush and the matcha, so it is a functional health food having an excellent herbal efficacy. Furthermore, though rush is harsh to the taste and inedible, the rush of the invention is soaked into the hot water so that the powdered rush has a refreshing flavor like matcha and becomes more delicious. Therefore after dissolving in the water or hot water for example, the rush juice powder becomes a green juice which is tasty and easy to drink.

Further, mixing a cyclic oligosaccharide provides a property to regulate intestinal disorders and to make it easy to drink by masking unfavorable tastes such as bitterness and astringency. The cyclic oligosaccharide, also being a kind of dietary fiber, increases the dietary fiber content and has a property to wrap up the bad bacteria in the intestine and cholesterol and neutral fatty acid in the blood to excrete them. Moreover, the rush juice powder has an extremely high function to remove active oxygen generated by the interaction between the powdered rush and the matcha, so it is a functional health food showing an excellent herbal efficacy. Furthermore, though rush is harsh to the taste and inedible, the rush of the invention is soaked into the hot water so that the powdered rush has a refreshing flavor like matcha and becomes more delicious. Therefore after dissolving in the water or hot water for example, the rush juice powder becomes a green juice which is tasty and easy to drink.

It is preferable that the blending ratio of the powdered rush is 32-45 (more preferably 35-45) percent by mass of the total rush juice powder and the blending ratio of the matcha is 20-32 (more preferably 22-32) percent by mass of the total rush juice powder.

Blending the powdered rush of 32-45 (more preferably 35-45) percent by mass and the matcha of 20-32 (more preferably 22-32) percent by mass can create an extremely high ability to eliminate active oxygen on the order of 40000-68000 unit/g in active oxygen eliminating activity. Particularly when blending the powdered rush of about 40 percent by mass and the matcha of 26-27 percent by mass, the active oxygen eliminating activity reaches the maximum value, 68000 unit/g (See example 3). The extremely high function to eliminate active oxygen like this may be caused by adding the property of the cyclic oligosaccharide to the synergistic action between the powdered rush and the matcha.

Preferably, the rush juice powder further includes milk sugar (lactose).

In this composition, the milk sugar serves for the nutrition of lactic bacteria in the intestine, and then is converted to lactic acid, degraded by enzyme (lactase) in the intestine and absorbed. The increased lactic bacteria in the intestine can affect regulating of intestinal disorders and constipation and promote the absorption of calcium. Additionally the milk sugar adds the sweetness which makes it easy to drink. The interaction between the cyclic oligosaccharide feeding useful good bacteria in the intestine and the milk sugar affecting the increase of lactic bacteria in the intestine can act to regulate intestinal disorder to regulate the intestinal environment.

The blanching treatment is a heating treatment to soak a rush into a boiled water at 90-100 degrees Celsius for 7-9 minutes; and the pulverization is done by impact crushing that a hammer fixed to a rotary disk rotates in a casing at a high speed.

In the rush juice powder according to the invention, it is possible to preferably remove the unused ash in a plant, to inactivate the enzyme in the plant, and further to pulverize the rush into a minute particle of 20 μm or less in the particle size constantly. That makes it easy to directly use the rush juice powder as a powdered food and to also drink the rush powder after mixing it into other drinks such as tea and milk, so it is desirable to drink it regularly after every meal.

As described above, the present invention, using rush as a major material, can provide a processed food with a high dietary fiber, antibacterial function and anti-inflammatory function. Further the present invention can effectively eliminate active oxygen through the interaction with matcha. In addition, including a cyclic oligosaccharide, the present invention provides a rush juice powder which has much more dietary fibers, affects regulating of intestinal disorders and is easy to drink.

DETAILED DESCRIPTION OF THE INVENTION

The following is a detailed description of the embodiment of the rush juice powder and the method for producing it according to the present invention.

The rush used for the rush juice powder of the embodiment is cultivated in Yatsushiro city, Kumamoto Pref. To eliminate the influence on the test (the results of the analysis), all the rush was grown without agricultural chemicals to the last and reaped when it reached a height of 150 cm.

The reaped rush was soaked in hot water (100 degrees Celsius or more) for 7-9 minutes (8 minutes in the embodiment) for blanching treatment, dried by hot-air of 55 degrees Celsius for 5 hours, then pulverized into a minute powder of 20 μm or less (18.6 μm in the embodiment) in the average diameter by a crusher (Model MICA-5J produced by MASUKO SANGYO Co., Ltd., in the embodiment).

The blanching treatment means the treatment to inactivate the enzyme in a rush by soaking the rush into hot water. As the blanching treatment is done before the hot-air drying and pulverization, the powdered rush is prevented from changing its color and nature. This enables to constantly keep the quality for a long term. Additionally the rush, inedible due to a lot of ash, by being boiled in hot water, obtains refreshing flavor like matcha (a powdered green tea) and becomes delicious and easy to drink.

In this example, a crusher performing impact crushing is used for pulverization, in which a hammer fixed to a rotary disk rotates in a casing at a high speed. Consequently the rush is crushed into a minute powder of 20 μm or less in the average diameter. Therefore the powdered rush is edible as a processed powdery food or drinkable by dissolving the powder in water, hot water or other variety of drinks.

As soaking into hot water before hot-air drying and pulverizing, the unused matter, ash, in a plant is optimally removed as described above to obtain a rush juice powder in which mainly medicinal properties alone are concentrated.

The Table 1 below shows the general chemical compositions of a rush. Referring to the Table 1, a rush includes 63 percent of dietary fiber, which means the rush contains the highest percentage of dietary fiber in the crops and edible vegetables. The rush has no less than 59.3 percent of insoluble dietary fiber. The Table 1 shows the general chemical compositions of a rush.

TABLE 1

General chemical compositions of a rush

| Item | Measured Value (g/100 g dry) |
| --- | --- |
| Protein | 18.9 |
| Fat | 0.6 |
| Dietary fiber | 63.0 |
| | (soluble fiber 3.7; insoluble fiber 59.3) |
| Sugar | 11.0 |
| Ash | 6.5 |
| Kalium | 2.37 |
| Calcium | 0.16 |
| Magnesium | 0.11 |
| Sodium | $34 \times 10^{-3}$ |
| Iron | $3.3 \times 10^{-3}$ |
| Zinc | $3.4 \times 10^{-3}$ |

TABLE 1-continued

General chemical compositions of a rush

| Item | Measured Value (g/100 g dry) |
|---|---|
| Ascorbic acid | $7.0 \times 10^{-3}$ |
| Beta-carotene | $6.5 \times 10^{-3}$ |
| Total tocopherol | $6.4 \times 10^{-3}$ |
| Luteolin | $38.8 \times 10^{-3}$ |
| Total chlorophyll | $165 \times 10^{-3}$ |

The dietary fiber has proven to have efficacy such as an anti-fat action, an inhibitory action on cholesterol-raising, an inhibitory action on blood sugar level elevation, an inhibitory action on colon cancer generation, and a removal action on harmful substances. The rush, containing a highest percentage of dietary fiber among edible vegetables, is a remarkably attractive foodstuff as a health food.

Subsequently the powdered rush thus made is mixed with matcha (powdered tea for a tea ceremony). The matcha, as is commonly known, is made by grinding a Tencha (a tea made from tea leaves which are grown without the sunlight for a slightly longer period than a refined tea or Gyokuro, steamed, dried separately leaf-by-leaf (Aracha) without being crumpled, and then rid of veins and stalks) using a stone mill.

The rush juice powder of the present invention is further mixed with a cyclic oligosaccharide and milk sugar.

For a high function eliminating active oxygen, in the rush juice powder of the embodiment of the invention, the blending ratio of the powdered rush is 32-45 percent in mass of the total rush juice powder and the blending ratio of the matcha is 20-32 percent in mass of the total rush juice powder. The blending ratio of both is not specifically limited as long as they are within each range. The examples 1-3 show the blend ratio of materials for each rush juice powder:

example 1: the powdered rush of 37.5 percent in mass, the matcha of 29.5 percent in mass, a cyclic oligosaccharide of 25.5 percent in mass and milk sugar of 7.5 percent in mass;

example 2: the powdered rush of 43 percent in mass, the matcha of 25.67 percent in mass, a cyclic oligosaccharide of 27.67 percent in mass and milk sugar of 6.66 percent in mass; and example 3: the powdered rush of 40 percent in mass, the matcha of 26.67 percent in mass, a cyclic oligosaccharide of 26.67 percent in mass and milk sugar of 6.66 percent in mass.

It is necessary to blend a cyclic oligosaccharide at a higher ratio than milk sugar, but that is not restrictive. Further milk sugar is not always blended.

The rush juice powder in this embodiment is made by blending the powdered rush, the matcha, a cyclic oligosaccharide and milk sugar at the above blending ratio or blending percentage. The following is how to routinely prepare the rush juice powder thus made: scooping about 3 g of the rush juice powder and dissolving it into water or hot water to make a green juice. The amount of water or hot water is about 100 ml-200 ml, though it can be altered to suit individual tastes. Drinking the rush juice once or twice a day will sufficiently effect removal of active oxygen. In addition to water or hot water, milk and juice are also preferable for dissolving the rush juice powder to drink.

Table 2 shows the results of analysis on the ingredients and superoxide eliminating activity of the rush juice powder (described as rush processed food (for a green juice)) of example 3 which is made by blending the powdered rush, the matcha, a cyclic oligosaccharide and milk sugar. The results of analysis on the same powdered rush alone are also shown in Table 2 for comparison to confirm the efficacy of the rush juice powder.

TABLE 2

Results of the analysis of the rush processed food

| | Rush processed food (for a green juice) | Powdered rush |
|---|---|---|
| Water | 6.9 (g/100 g) | 4.7 (g/100 g) |
| Protein | 10.6 | 9.5 |
| Fat | 3.3 | 3.3 |
| Ash | 3.1 | 3.1 |
| Sugar | 41.2 | 7.0 |
| Dietary fiber | 34.9 | 72.4 |
| Superoxide eliminating activity | 68000 unit/g | 4200 unit/g |

The superoxide eliminating activity is the SOD-like activity measured by ESR method (electron spin resonance technique). SOD (Superoxide Dismutase) is an enzyme to remove (eliminate) active oxygen, superoxide, namely an active oxygen scavenging (eliminating) enzyme. The activity is measured by an analytical test of the removing (eliminating) capacity in units, where a unit is a capacity to remove (eliminate) 1 μmol/L of active oxygen per minute. The results are shown in Table 2.

The rush juice powder of the embodiment has more sugar and less dietary fiber compared to the powdered rush alone. This might be caused by blending more than 30 percent in mass of a cyclic oligosaccharide and milk sugar. The powdered rush has 4200 unit/g of superoxide eliminating activity and the matcha is known to have considerably lower superoxide eliminating activity than the powdered rush, though not specifically measured. The superoxide eliminating activity of the rush juice powder of the embodiment rises extremely up to 68000 unit/g. The term 'up to 68000 unit/g' is used because the measurement with adjusting the blending ratio of the powdered rush and the matcha in the range mentioned above (the blending ratio of the powdered rush is 32-45 percent in mass of the total rush juice powder and that of the matcha is 20-32 percent in mass of the total rush juice powder) gave the value from 40000 to 68000 unit/g.

Referring to the results of the analysis, the rush juice powder (the rush processed food) of the present invention has such a high (more than ten times) superoxide eliminating activity that can not be explained by each superoxide eliminating activity of the powdered rush with higher superoxide eliminating activity than other edible vegetables and of the matcha. Consequently it is obvious that the rush juice powder is a new rush processed food with an excellent function of superoxide eliminating activity. Each analysis data of Table 1, 2 and 3 are the test results in Japan Food Research Laboratories.

The rush processed food as a rush juice powder is a functional health food made from plants and causes no side effects or drug-induced diseases.

Therefore the processed food for a rush green juice according to the present invention is a processed food which is good for health and made from natural substances causing no side effects, raising spontaneous healing power and immunity, and having preventive effects.

As described above, according to the present invention, the rush processed food is made by pulverizing a nontoxic rush with a high percentage of dietary fiber and then blending it with matcha, so that it has no side effects or drug-induced diseases and can be ingested as a tea after mixing with other foods. In addition, the blanching treatment and the pulverization after hot-air drying prevent the rush processed food from changing its color and nature for a long term, which makes it possible to keep high quality for a long term. Further, blending with a cyclic oligosaccharide or milk sugar causes the rush processed food affect regulation of internal disorders brought by a cyclic oligosaccharide or milk sugar in addition to the interaction between the powdered rush and the matcha and provides a functional health food with refreshing flavor and sweetness.

Since the blending ratio of the powdered rush is higher than that of the matcha, a cyclic oligosaccharide or milk sugar, antibacterial function and anti-inflammatory function of the powdered rush are sufficiently displayed. Additionally with the synergism of the powdered rush and the matcha, the rush processed food has the effect of eliminating active oxygen at a quite high level compared to the case of using them independently.

Especially according to the present invention, a functional health food made from plants greatly effective in superoxide eliminating activity can be obtained. Therefore the rush processed food of the present invention, if it is taken daily, can efficiently eliminate the active oxygen accumulated in the body and can be an extremely effective processed food for reducing the active oxygen generated in the body by the stress or the like.

Table 3 shows the results of analyzing chlorophyll in the powdered rush and other foodstuffs.

possible to measure the chlorophyll a and chlorophyll b by the absorption photometry which measures the frequency of the absorbed light.

The method of measurement includes the process: mixing the dried sample powder into the acetone solution (containing acetone, water and basic magnesium carbonate); and performing homogenized extraction and centrifugation to obtain a supernatant liquid. Then the following process is repeated three times: adding diethyl ether and water to the supernatant liquid to separate it into a water layer and a diethyl ether layer; and removing the water layer. And then the diethyl ether layer is dehydrated by anhydrous sodium sulfate before being accepted by diethyl ether for measuring the absorbance.

The absorbance is measured at the wavelength of 660 nm and 642.5 nm, and the light path length of 10 mm. The total chlorophyll is calculated by adding each value obtained by multiplying the absorbance at each wavelength by the determined coefficient. The chlorophyll a is calculated by subtracting the value obtained by multiplying the absorbance at the wavelength of 642.5 nm by the determined coefficient from the value obtained by multiplying the absorbance at the wavelength of 660 nm by the determined coefficient. The chlorophyll b is calculated by subtracting the value of the chlorophyll a from the value of the total chlorophyll.

TABLE 3

| | (mg/100 g - Solid content) | | | Moisture content |
| --- | --- | --- | --- | --- |
| | Total chlorophyll | Chlorophyll a | Chlorophyll b | (%) |
| Powdered rush | 169.54 | 119.09 | 50.45 | 2.8 |
| Rush juice powder | 63.89 | 42.66 | 21.23 | 3.2 |
| Powdered green tea | 288.12 | 144.14 | 143.98 | 4.6 |
| Powdered mugwort | 441.24 | 374.88 | 66.36 | 5.2 |
| Green pepper | 10.38 | 6.98 | 3.4 | 93.3 |
| Small green pepper (Shishitou) | 11.06 | 7.82 | 3.24 | 90.4 |
| Hau tree (at seaside) | 116.26 | 85.59 | 30.67 | 78.5 |
| Hau tree (at a private house) | 40.28 | 28.41 | 11.87 | 69.7 |
| Welsh onion planted in tofu refuse | 87.46 | 63.56 | 23.9 | |
| Welsh onion planted in a pot | 63.23 | 46.51 | 16.72 | |
| Parsley planted in tofu refuse | 201 | 141.81 | 59.19 | |
| Parsley planted in a pot | 171.58 | 122.48 | 49.1 | |
| Fresh raw rush | 91.21 | 66.61 | 24.6 | |
| Spinach | 75.34 | 51.47 | 23.87 | 94.10 |
| Leek | | | | 93.8 |
| Parsley | | | | 85.2 |
| Bitter melon | 7.66 | 5.01 | 2.56 | 94.8 |
| Stalk of a parsley | | | | 91.4 |
| Powdered bitter melon | 51.56 | 31.97 | 19.59 | |
| Powdered Bigu (a rush in Okinawa) | 200.85 | 146.77 | 54.08 | |
| Green juice (Trial) | 226.82 | 158 | 68.82 | |
| Young leaves of barley | 406.54 | 288.01 | 118.53 | |

In the analysis of chlorophyll the total chlorophyll, the chlorophyll a, and the chlorophyll b contained in each foodstuff are measured.

Generally plants have two photosynthesis pigments, chlorophyll a and chlorophyll b. Each of them absorbs the light of different wavelength so as to efficiently perform photosynthesis under a variety of light conditions. Therefore it is As shown in Table 3, the powdered rush, the matcha and young leaves of barley have comparatively high total chlorophyll content. Generally a land plant has high chlorophyll content.

The chlorophyll is known to have the antioxidant action, anti-tumor action, action of lowering cholesterol, action of improving anemia, and odor eliminating action. Therefore these edible vegetables with comparatively high total chlorophyll content are preferable as foodstuffs for the ingestion of chlorophyll.

Additionally, in order to make good use of the function of the rush to eliminate active oxygen, the pulverized rush is blended with the matcha and a cyclic oligosaccharide at each determined rate to produce a rush processed food as a green juice, which is easy to ingest and drink.

The matcha is a material of tea frequently taken at mealtime or during a break time. So blending it with the powdered rush which has high medicinal benefits can make the powdered rush, a functional health food, drinkable like tea.

A cyclic oligosaccharide, tasteless and odorless though, has the effect of increasing good bacteria by feeding them in the intestines. It also has a hollow structure made by sugar molecules forming a circle. As a result, it has a function to wrap up molecules of every kind in the hollow, especially in the embodiment, to wrap up molecules generating bitterness or astringency in the rush juice powder, and takes effect to make the rush juice powder easy to drink.

Consequently the rush processed food as a green juice powder, which is suitable to drink by mixing the powdered rush with the matcha and a cyclic oligosaccharide at a determined ratio, appears promising as a health food with new medicinal effects.

Further by mixing milk sugar which is effective on increasing lactic bacteria, the rush processed food becomes more tasty and easy to drink. Additionally, this composition causes an interaction between a cyclic oligosaccharide and milk sugar, the rush processed food can display an excellent effect on regulating intestinal disorders to control the intestinal environment.

The invention claimed is:

1. A rush juice powder comprising:
   a powdered rush *Juncus Effusus*;
   a matcha powdered green tea *Camellia Sinesis* and a cyclic oligosaccharide;
   wherein the powdered rush is made by soaking a rush in hot water for a blanching treatment, drying the blanched rush using hot-air, and then pulverizing the dried blanched rush; and
   wherein a quantity of the powdered rush is about 40 percent by mass of a total amount of the rush juice powder, and a quantity of the matcha powdered green tea is in a range of 26 to 27 percent by mass of the total amount of the rush juice powder.

2. The rush juice powder according to claim 1, wherein both the matcha powdered green tea and the cyclic oligosaccharide are blended into the powdered rush.

3. The rush juice powder according to claim 1, further comprising milk sugar.

4. The rush juice powder according to claim 1, wherein the blanching treatment comprises a heating treatment including soaking the rush in hot water at a temperature in a range of 90° C. to 100° C. for a period of 7 to 9 minutes; and the pulverizing comprises impact crushing by rotating a hammer fixed to a rotary disk in a casing at a high speed.

5. The rush juice powder according to claim 1, wherein the powdered rush comprises pulverized dried blanched rush having a particle size no greater than 20 μm.

6. The rush juice powder according to claim 1, wherein a percent by mass of the cyclic oligosaccharide is greater than a percent by mass of the milk sugar.

7. A method of manufacturing rush juice powder, said method comprising:
   forming a powdered rush *Juncus Effusus* by soaking a rush in hot water for a blanching treatment, drying the blanched rush using hot-air, and then pulverizing the dried blanched rush;
   providing a matcha powdered green tea *Camellia Sinesis* and a cyclic oligosaccharide; and
   mixing the powdered rush with the matcha powdered green tea such that a percent by mass of the powdered rush is about 40% by mass of a total amount of the rush juice powder, and a percent by mass of the matcha powdered green tea is in a range of 26% to 27% by mass of a total amount of the rush juice powder.

8. The method according to claim 7, further comprising mixing in milk sugar.

9. The method according to claim 7, wherein said blanching treatment comprises a heating treatment including soaking the rush in hot water at a temperature in a range of 90° C. to 100° C. for a period of 7 to 9 minutes; and the pulverizing comprises impact crushing by rotating a hammer fixed to a rotary disk in a casing at a high speed.

\* \* \* \* \*